(12) United States Patent
Thommana et al.

(10) Patent No.: US 10,159,073 B2
(45) Date of Patent: Dec. 18, 2018

(54) SYSTEMS AND METHOD FOR ADAPTIVE FREQUENCY MANAGEMENT UTILIZING MULTIPLE FREQUENCY SETS

(71) Applicants: John Thommana, Cedar Rapids, IA (US); Naveen Rajanikantha, Marion, IA (US); Lizy Paul, Cedar Rapids, IA (US)

(72) Inventors: John Thommana, Cedar Rapids, IA (US); Naveen Rajanikantha, Marion, IA (US); Lizy Paul, Cedar Rapids, IA (US)

(73) Assignee: Rockwell Collins, Inc., Cedar Rapdis, IA (US)

( * ) Notice: Subject to any disclaimer, the term of this patent is extended or adjusted under 35 U.S.C. 154(b) by 230 days.

(21) Appl. No.: 14/803,881

(22) Filed: Jul. 20, 2015

(65) Prior Publication Data

US 2017/0026076 A1 Jan. 26, 2017

(51) Int. Cl.
*H04B 1/00* (2006.01)
*H04W 72/04* (2009.01)
*H04B 1/7143* (2011.01)
*H04K 3/00* (2006.01)

(52) U.S. Cl.
CPC ...... *H04W 72/0453* (2013.01); *H04B 1/7143* (2013.01); *H04K 3/226* (2013.01); *H04K 3/25* (2013.01); *H04K 3/28* (2013.01); *H04K 3/42* (2013.01)

(58) Field of Classification Search
CPC .......... H04B 2001/7154; H04B 1/7143; H04B 1/715; H04B 1/713; H04B 1/7156; H04B 1/707; H04B 1/69; H04B 1/7075; H04J 13/10; H04J 13/00
USPC ................ 375/132, 131, 130, 219, 295, 316
See application file for complete search history.

(56) References Cited

U.S. PATENT DOCUMENTS

| | | | | |
|---|---|---|---|---|
| 6,128,328 A * | 10/2000 | Schilling | ................. | H04J 13/00 375/134 |
| 6,466,608 B1 * | 10/2002 | Hong | ................... | H04B 1/7156 375/137 |
| 2010/0046583 A1 * | 2/2010 | So | ......................... | H04L 1/0001 375/133 |
| 2014/0274174 A1 * | 9/2014 | Sekiya | ................ | H04W 72/082 455/500 |

* cited by examiner

*Primary Examiner* — Zewdu Kassa
(74) *Attorney, Agent, or Firm* — Angel N. Gerdzhikov; Donna P. Suchy; Daniel M. Barbieri

(57) ABSTRACT

Frequency management methods and communication networks utilizing such frequency management methods are disclosed. More specifically, multiple frequency sets may be utilized to facilitate frequency hopping and a frequency management method may implement various switching schemes to switch between the different frequency sets. Techniques such as synchronization and spectrum harvesting may also be provided to support utilization of multiple frequency sets, all of which may provide improved operation reliabilities and better handling of jamming signals.

17 Claims, 5 Drawing Sheets

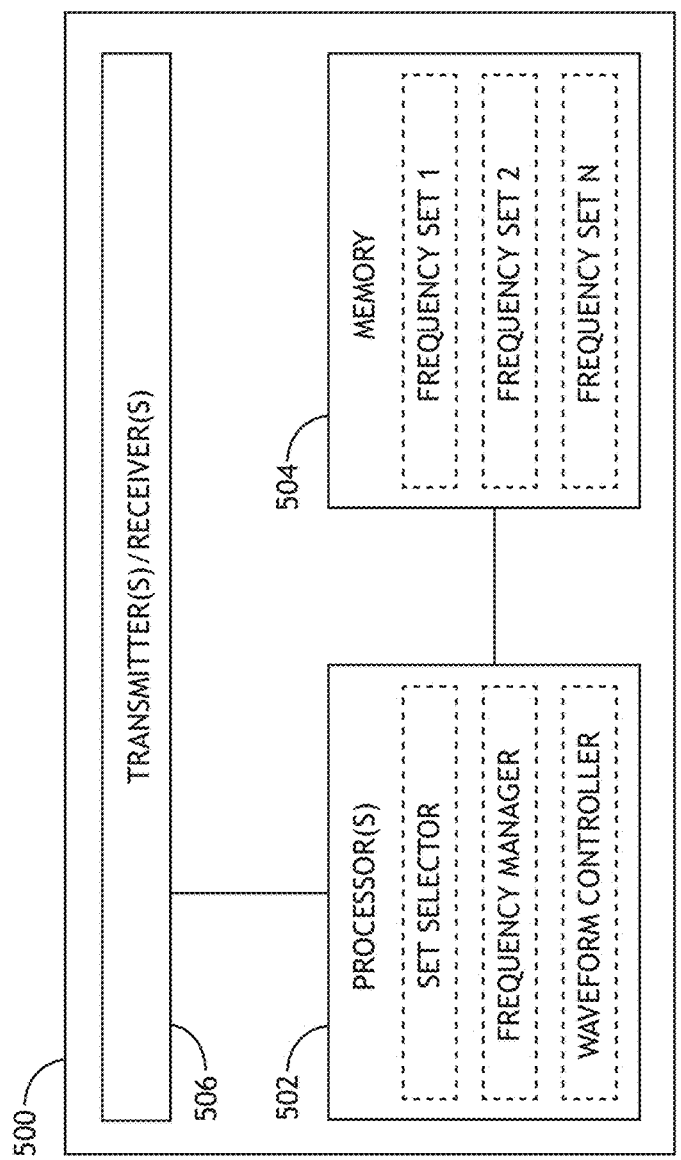

SYSTEMS AND METHOD FOR ADAPTIVE FREQUENCY MANAGEMENT UTILIZING MULTIPLE FREQUENCY SETS

BACKGROUND

Frequency hopping is a method of transmitting signals by switching a carrier among many frequency channels, using a pseudorandom sequence known to both the transmitter and the receiver. Frequency hopping is commonly used to avoid jamming. For instance, a large frequency hopping set may be used so that communications can be carried out in the presence of a jammer. It is noted, however, that spectrum shortage is forcing the frequency hopping set to be smaller than what may be required for it to reliably mitigate jamming. Self-jamming, where friendly parties may use a frequency hopping set with overlapping frequencies, is also becoming common due to lack of available frequency channels.

It is also noted that conventional frequency hopping techniques do not have any mechanisms to react to jamming. A network implementing conventional frequency hopping, for example, merely follows a pre-determined pseudorandom hopping pattern that is used by all radio nodes in the network to remain in network synchronism.

SUMMARY

In one aspect, embodiments of the inventive concepts disclosed herein are directed to a radio. The radio may include a non-transitory processor-readable memory configured to store a plurality of frequency sets, wherein each frequency set of the plurality of frequency sets includes a plurality of frequency channels. The radio may also include at least one processor in communication with the non-transitory processor-readable memory. The at least one processor may be configured to: select a frequency set from the plurality of frequency sets as a current frequency set; generate an index value; select a frequency channel from the plurality of frequency channels specified in the current frequency set according to the index value; and control a waveform of the radio based on the selected frequency channel.

In a further aspect, embodiments of the inventive concepts disclosed herein are directed to a frequency hopping radio network. The frequency hopping radio network may include a plurality of radio nodes. Each radio node of the plurality of radio nodes may include a non-transitory processor-readable memory configured to store a plurality of frequency sets, wherein each frequency set of the plurality of frequency sets includes a plurality of frequency channels. Each radio node of the plurality of radio nodes may also include at least one processor in communication with the non-transitory processor-readable memory. The at least one processor may be configured to: select a frequency set from the plurality of frequency sets as a current frequency set; generate an index value; select a frequency channel from the plurality of frequency channels specified in the current frequency set according to the index value; and control a waveform of the radio based on the selected frequency channel. The at least one processor of each radio node of the plurality of radio nodes may be configured to select the current frequency set in a same deterministic and synchronous manner.

In another aspect, embodiments of the inventive concepts disclosed herein are directed to a frequency hopping method. The frequency hopping method may include: providing a plurality of frequency sets, wherein each frequency set of the plurality of frequency sets includes a plurality of frequency channels; selecting a frequency set from the plurality of frequency sets as a current frequency set; generating an index value; selecting a frequency channel specified in the current frequency set based on the index value; and controlling a waveform of a radio based on the selected frequency channel.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

The numerous objects and advantages of the inventive concepts disclosed herein may be better understood by those skilled in the art by reference to the accompanying drawings, in which:

FIG. 5 is a block diagram depicting a radio according to an exemplary embodiment of the inventive concepts disclosed herein.

DETAILED DESCRIPTION

Reference will now be made in detail to exemplary embodiments of the inventive concepts disclosed herein, examples of which are illustrated in the accompanying drawings.

Embodiments in accordance with the inventive concepts disclosed herein are directed to frequency management methods and communication networks utilizing such frequency management methods. More specifically, multiple frequency sets may be utilized to facilitate frequency hopping and a frequency management method may implement various switching schemes to switch between the different frequency sets. Techniques such as synchronization and spectrum harvesting may also be provided to support utilization of multiple frequency sets, all of which may provide improved operation reliabilities and better handling of jamming signals.

Figure 1:
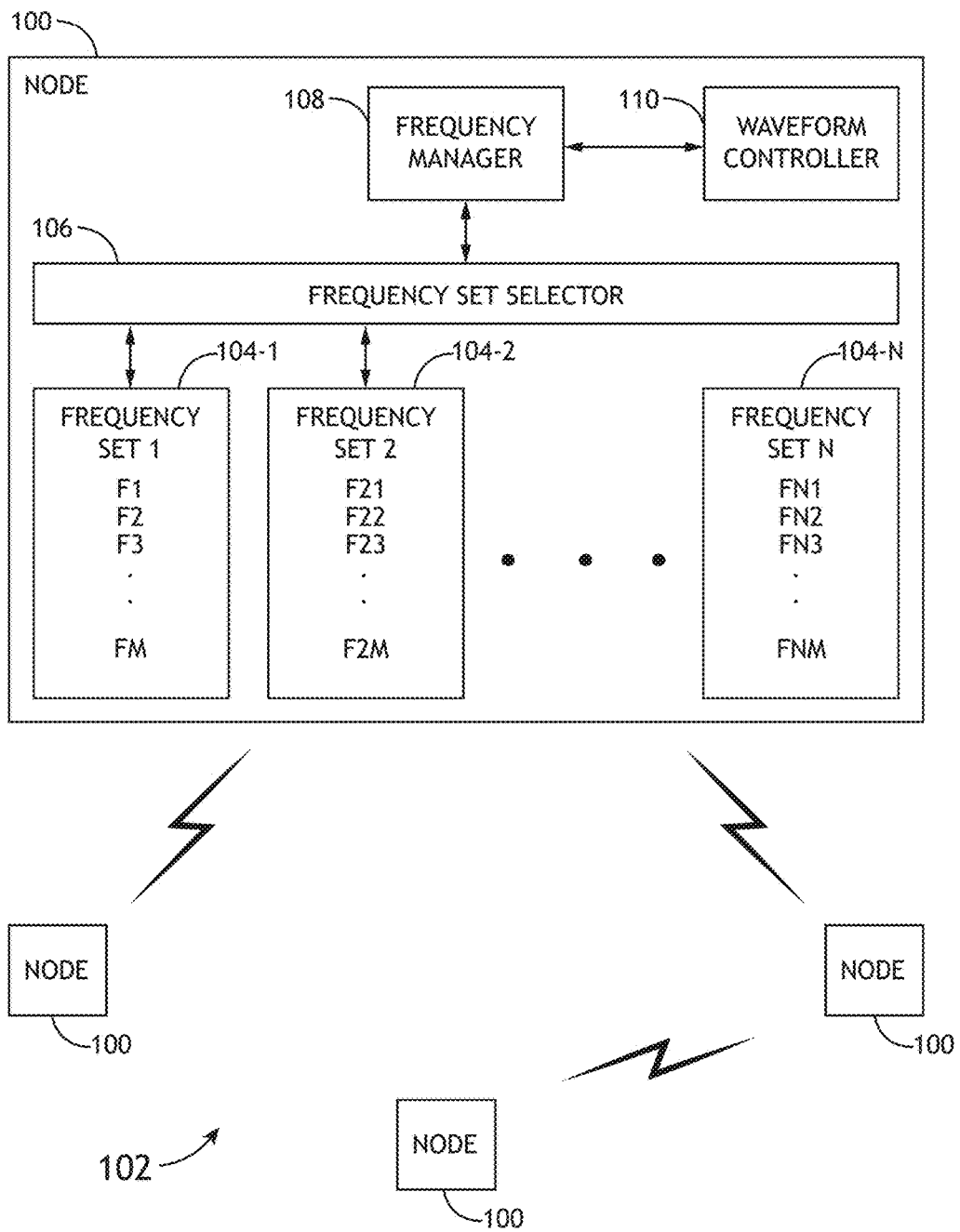
FIG. 1 is a block diagram block diagram depicting various radio nodes participating in a network according to an exemplary embodiment of the inventive concepts disclosed herein.

Referring to FIG. 1, a block diagram depicting various radio nodes 100 participating in a network 102 configured according to an exemplary embodiment of the inventive concepts disclosed herein is shown. For illustrative purposes, only one of the nodes 100 is shown and described in detail to show its support of multiple frequency sets 104. It is to be understood that, in certain implementations, all nodes 100 participating in the network 102 are configured in the same or similar manner.

As shown in FIG. 1, each frequency set 104 may include a number of frequency channels (M) specified for frequency hopping. It is also noted that N-number of frequency sets 104 may be supported, and the number N may be a configurable parameter. It is to be understood that the term "frequency set" refers to a collection of frequency channels, which may also be referred to as a frequency group, a frequency list or the like. In certain implementations, the frequency sets 104 may be stored in one or more non-transitory processor-readable memories as lookup tables. The frequency sets 104 may therefore be referred to as frequency tables 104 without departing from the broad scope of the inventive concepts disclosed herein.

Each node 100 may include a frequency set selector 106 configured to select one of the frequency sets to be utilized. Each node 100 may also include a frequency manager 108 configured to choose a frequency channel specified in the selected frequency set 104. The frequency channel chosen by the frequency manager 108 may then be provided to a waveform controller 110, which may control the waveform of the node 100 according to the frequency channel chosen by the frequency manager 108 to facilitate frequency hopping.

It is contemplated that the frequency set selector 106 may be configured to change the selection of the frequency set 104 under various conditions or according to various schemes. In some embodiments, the frequency set selector 106 may change frequency sets 104 upon receipt of a set switch command. For instance, a set switch command may be issued to all nodes 100 participating in the network 102 when a triggering event is detected, prompting the frequency set selectors 106 of the various nodes 100 to switch from a frequency set currently in use (e.g., frequency set 104-1) to another frequency set (e.g., frequency set 104-2) at a specified time. It is contemplated that a condition where jamming and/or self-jamming become evident may be considered as a triggering event. It is to be understood that such a triggering event may be system-detected or user-reported.

In some embodiments, however, instead of (or in addition to) reacting to a triggering event, the frequency set selectors 106 of the various nodes 100 participating in the network 102 may utilize a common pseudorandom algorithm to determine which frequency set 104 (e.g., identifiable using a set identifier) should be used for frequency hopping and for how long, allowing the frequency set selectors 106 of the various nodes 100 to switch to the identified frequency set 104 and utilize the identified frequency set 104 for a specified duration in a pseudorandom but synchronous manner. Alternatively, the frequency set selectors 106 of the various nodes 100 may switch frequency sets 104 according to a periodic interval and utilize each frequency set 104 for a period of time before next switch occurs. The set identifiers may also be cycled through (instead of pseudo-randomly determined) to facilitate the switch.

It is to be understood that the schemes described above for handling frequency set switching are merely exemplary. It is contemplated that various other switching schemes may be utilized to determine when and/or how switching should be handled without departing from the broad scope of the inventive concepts disclosed herein, as long as the switching schemes can be carried out in a deterministic and synchronous manner across all nodes 100 participating in the network 102. It is also contemplated that frequency set switching may happen at any specified time, including the start of a frame (or mini-frame) or even mid-frame.

Once a frequency set 104 is selected, the frequency manger 108 may select a particular frequency channel from the selected frequency set 104 for the waveform controller 110. For illustrative purposes, suppose each frequency set 104 is an M-member set (i.e., each frequency set 104 has M-number of frequency channels to choose from), the frequency manager 108 may use a pseudorandom algorithm to generate an index value between 1 and M, inclusive, and select a frequency channel from the selected frequency set 104 based on the generated index value.

It is contemplated that the frequency manger 108 may be able to determine the index value independently with respect to the processes carried out in the frequency set selector 106 and vice versa. In other words, the index value may be determined regardless of which frequency set 104 is in use. It is to be understood, however, that the frequency manger 108 and the frequency set selector 106 may be jointly processed using the same set of processors without departing from the broad scope of the inventive concepts disclosed herein.

Figure 2:
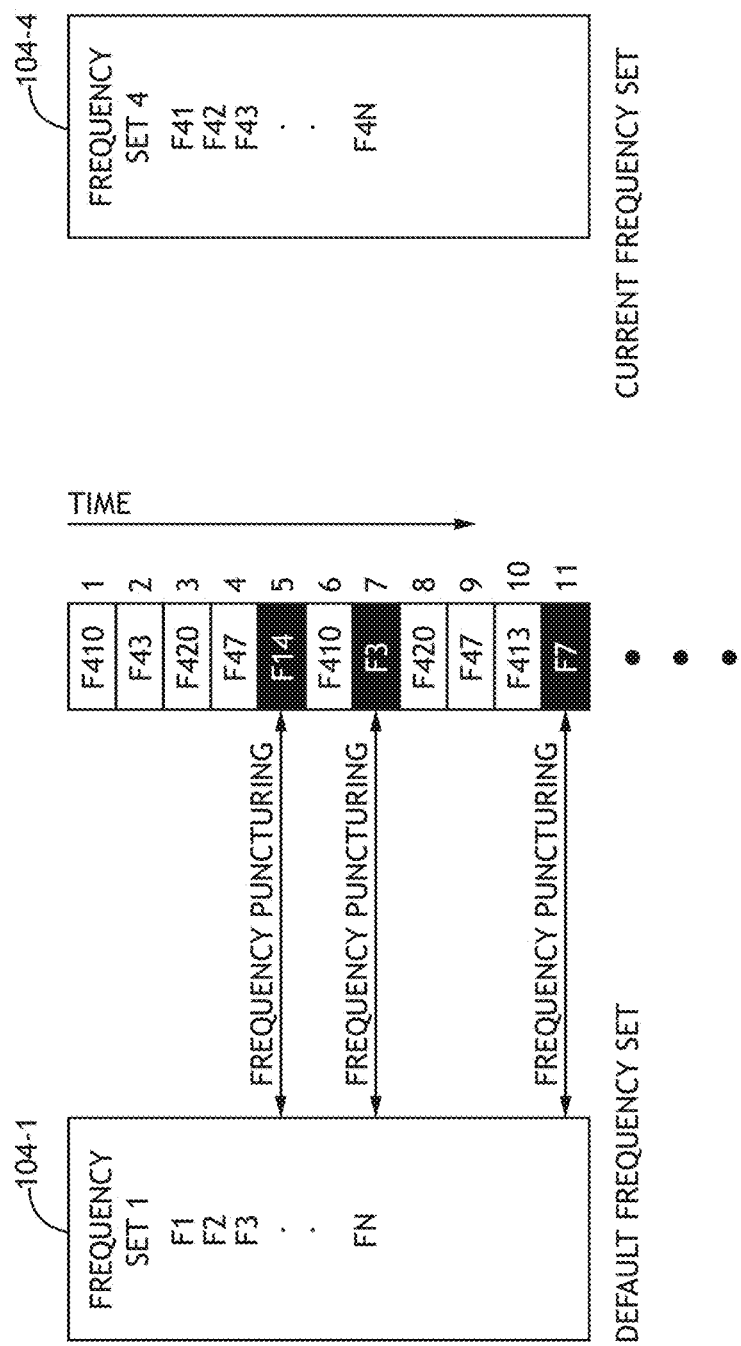
FIG. 2 is an illustration depicting a frequency puncturing technique according to an exemplary embodiment of the inventive concepts disclosed herein.

It is also contemplated that there may be instances when one or more nodes 100 can get out of synchronization. This may happen, for example, due to changes to the network 102 (e.g., nodes joining, leaving, or merging), or if an existing node 100 failed to receive a set switch command. Because nodes out of synchronization are unable to determine which frequency set is currently in use, synchronization techniques may be required to properly handle such unsynchronized nodes. FIG. 2 is an illustration depicting a technique referred to as frequency puncturing, which, when performed in conjunction with synchronization bursts, may help unsynchronized nodes get back into the network 102.

As shown in FIG. 2, the frequency puncturing technique may utilize two frequency sets 104-1 and 104-4 in parallel. For illustrative purposes, suppose the frequency set 104-4 is the set selected by the frequency set selector 106. As previously described, all nodes 100 participating in the network 102 should use the frequency set 104-4 for frequency hopping once the frequency set 104-4 is selected. However, because an unsynchronized node 100 is unaware of the selection made by the frequency set selector 106, some form of communication must be carried out to the unsynchronized node 100 using an alternative frequency set that the unsynchronized node 100 is aware of. This alternative frequency set may be referred to as the default frequency set 104-1 for illustrative purposes. It is to be understood that any one of the frequency sets 104 shown in FIG. 1 may be designated as the default frequency set.

In some embodiments, the frequency puncturing technique depicted in FIG. 2 may be used to carry out synchronization bursts within the network 102. Synchronization bursts are commonly used in communication networks to help communicate synchronization information to unsynchronized nodes. These bursts are typically pseudo-randomly scattered in time and occur on different frequency channels so that they can be determined only by nodes authorized to join the network. Relating to the example shown in FIG. 2, synchronization bursts may occur at time instances 5, 7, and 11. It is noted that when a synchronization burst occurs, instead of using the frequency set 104-4 selected by the frequency set selector 106 to carry out the burst, the default frequency set 104-1 may force (puncture) itself to temporarily replace the selected frequency set 104-4 and carry out the burst instead.

It is noted that the frequency puncturing technique depicted in FIG. 2 only temporarily changes the frequency set, but does not alter the index value (which is generated by the frequency manger 108 as previously described). For example, if the frequency manger 108 determines that index value of 14 should be used at time instance 5, the same index value should be used no matter which frequency set is to be used at time instance 5. It is also noted that the frequency manger 108 of an unsynchronized node 100 should also generate the same index value for the same time instance. This effectively allows the unsynchronized node 100 (which is unaware of the fact that the frequency set 104-4 is currently selected) to nonetheless hop to the same exact frequency channels used to carry out synchronization bursts, and upon receiving the synchronization bursts, the unsynchronized node 100 may be informed of the frequency set selections and join the network 102 properly.

It is contemplated that not all synchronization bursts are required to be carried out using frequency puncturing. For instance, in certain implementation, only a subset of synchronization bursts may be carried out using the default frequency set 104-1 while the rest may still be carried out using the selected frequency set 104-4. The subset that is to be carried out using the default frequency set 104-1 may be determined using a pseudorandom algorithm or other commonly used randomization algorithms. It is to be understood that whether to apply frequency puncturing to all synchronization bursts, or only a subset of synchronization bursts, may be determined based on various factors, including the tradeoff between net-entry latency and increased resistance to jamming.

It is also contemplated that various techniques may be utilized to configure the frequency sets 104 made available to each node 100. For instance, some frequency sets 104 may span across a similar (or same) frequency band, but with different frequency channels arrangements. Some frequency sets 104, on the other hand, may span across different (or mutually exclusive) frequency bands, allowing the nodes 100 participating in the network 102 to switch to different frequency bands when needed.

It is noted that providing abilities to switch frequency bands may be appreciated in various situations. For example, suppose the frequency channels in a first frequency set (e.g., frequency set 104-1) are in the 30-88 MHz band. If the waveform performance starts to degrade because of a jammer or self-jamming, the waveform can switch to a second frequency set (e.g., frequency set 104-2) where the frequency channels are in 225-400 MHz band, or to a third frequency set (e.g., frequency set 104-3) where the frequency channels are in L-band. Another option, as described previously, is that the waveform may randomly switch between the three frequency sets. It is noted that switching frequency sets effectively changes frequency bands, causing the jammer to either pause and recalculate its jamming strategy, or to spread its power across multiple bands, thereby helping the waveform defeat jamming. It is also feasible to include frequency channels from different frequency bands in a single frequency set 104. Technologies such as multi-band software-defined radios may be able to quickly switch bands and tune to the frequency within the time allotted for frequency tuning.

Figure 3:
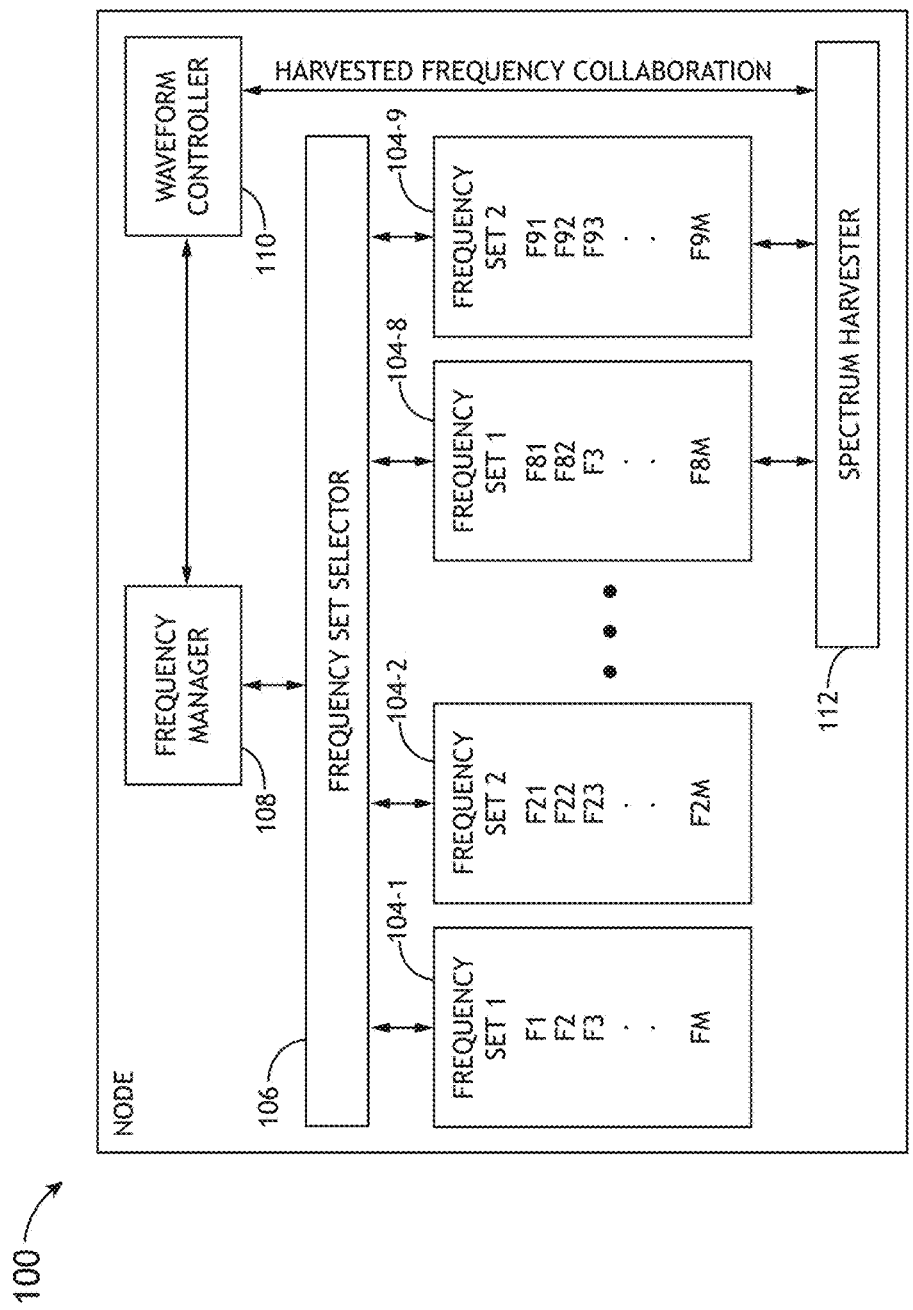
FIG. 3 is a block diagram depicting a node configured to utilize spectrum harvesting according to an exemplary embodiment of the inventive concepts disclosed herein.

It is further contemplated that, in certain implementations, as shown in FIG. 3, a subset of the frequency sets (e.g., frequency sets 104-8 and 104-9) may be reserved and utilize to support spectrum harvesting. In other words, the frequency sets 104-8 and 104-9 may be left blank at startup and filled in later by spectrum harvesting devices 112. It is noted that the spectrum harvesting devices 112 may be implemented as external devices/sensors or devices/sensors internal to a node 100 (e.g., the node 100 may include an auxiliary receiver or use the main receiver periodically in a spectrum harvesting mode). It is to be understood that specific implementations of the external and/or internal spectrum harvesting devices 112 may vary without departing from the broad scope of the inventive concepts disclosed herein.

When spectrum harvesting is engaged at a node 100, the spectrum harvesting devices 112 may be activated to find frequency channels not being used by other users. These frequency channels may be filled into a frequency set and subsequently utilized as one of the frequency sets 104 as previously described. It is noted that if certain nodes 100 participating in the network 102 are geographically separated, these geographically separated nodes 100 may need to exchange and/or collaborate harvested spectrum information to create a subset of frequency channels that will not cause interference in any of the geographical regions. It is contemplated that the frequency sets filled using spectrum harvesting may be added, modified, or removed depending on the specific operating conditions. If no frequency set can be filled using spectrum harvesting, the frequency set selector 106 may default back to the predefined frequency set(s) and operated in the same manner as previously described.

Figure 4:
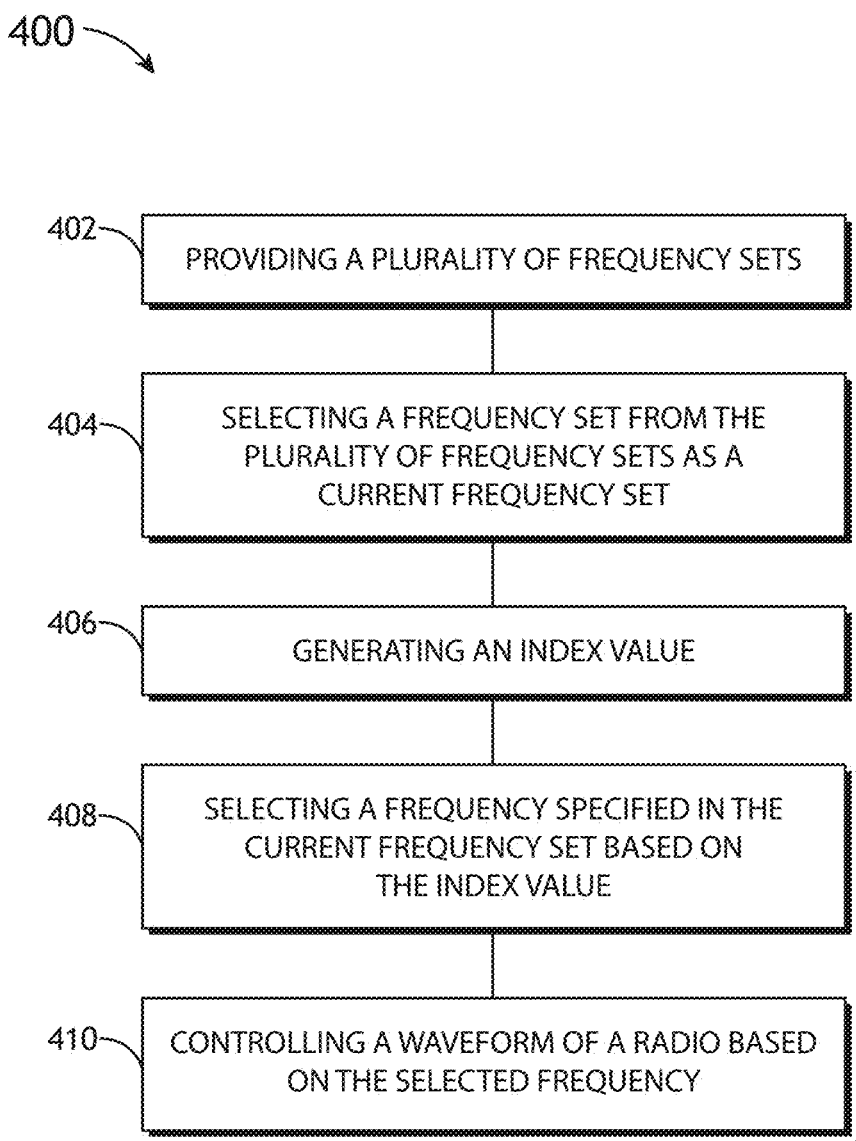
FIG. 4 is a flow diagram depicting a frequency hopping method according to an exemplary embodiment of the inventive concepts disclosed herein.

Referring now to FIG. 4, a flow diagram depicting an embodiment of a frequency hopping method 400 in accordance with the inventive concepts disclosed herein is shown. As depicted in FIG. 4, a plurality of frequency sets may be provided in a step 402. One of the frequency sets may be selected in a step 404 as the frequency set of choice (may be referred to as the current frequency set) to facilitate frequency hopping. A step 406 may generate an index value, and a step 408 may select a frequency channel specified in the current frequency set based on the index value. The selected frequency channel may then be utilized in a step 410 and the waveform of a frequency hopping radio may be controlled accordingly.

It is contemplated that the method 400 may implement the various frequency set selection/switching schemes previously described. It is also contemplated that the method 400 may implement the various synchronization and spectrum harvesting techniques previously described as well.

FIG. 5 is a simplified block diagram depicting an exemplary radio 500 configured to carry out the frequency hopping method 400 presented above. As shown in FIG. 5, the radio 500 may include one or more processors 502, one or more non-transitory processor-readable memories 504, and one or more transmitters and/or receivers 506. The one or more non-transitory processor-readable memories 504 may be utilized to store processor-executable code as well as the plurality of frequency sets. The one or more processors 502 may be implemented as dedicated processing units, application-specific integrated circuits (ASICs), field-programmable gate arrays (FPGAs) or various other types of processors or processing units. When the processor-executable code stored in the one or more non-transitory processor-readable memories 504 is executed by the one or more processors 502, the one or more processors 502 may carry out the various functions and method steps previously described, including set selection, frequency management, and waveform control.

It is to be understood that embodiments of the inventive concepts disclosed herein may be conveniently implemented in forms of a software, hardware or firmware package. Such a package may be a computer program product which employs a computer-readable storage medium including stored computer code which is used to program a computer to perform the disclosed function and process of the inventive concepts disclosed herein. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is to be understood that the specific order or hierarchy of steps in the processes disclosed is an example of exemplary approaches. It is to be understood that the specific order or hierarchy of steps in the processes may be rearranged while remaining within the broad scope of the present disclosure. The accompanying method claims present elements of the various steps in a sample order, and are not meant to be limited to the specific order or hierarchy presented.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A radio, comprising:
a non-transitory processor-readable memory configured to store a plurality of frequency sets, wherein each frequency set of the plurality of frequency sets includes a plurality of frequency channels specified for frequency hopping; and
at least one processor in communication with the non-transitory processor-readable memory, the at least one processor configured to:
select or change a selection of one of the plurality of frequency sets as a current frequency set;
generate an index value;
select a frequency set different from the current frequency set based on at least one of: a pseudorandom algorithm and a periodic interval;
select one of the plurality of frequency channels specified in the current frequency set according to the index value; and
control a waveform of the radio based on the selected frequency channel for a hopping period.

2. The radio of claim 1, wherein each of the plurality of frequency sets is an M-member set, and wherein the index value is pseudo-randomly generated to identify a particular member of an M-member set.

3. The radio of claim 1, wherein the at least one processor is further configured to select a frequency set different from the current frequency set upon receiving a set switch command.

4. The radio of claim 1, wherein one of the plurality of frequency sets is designated as a default frequency set for synchronization bursts, and wherein the at least one processor is further configured to select a frequency channel specified in the default frequency set based on the index value to carry out at least a subset of synchronization bursts.

5. The radio of claim 4, wherein the current frequency set is identified in at least the subset of synchronization bursts.

6. The radio of claim 1, wherein the at least one processor is further configured to generate at least a portion of at least one of the plurality of frequency sets based on spectrum harvesting.

7. A frequency hopping radio network, comprising:
a plurality of radio nodes,
wherein each radio node of the plurality of radio nodes includes:
a non-transitory processor-readable memory configured to store a plurality of frequency sets, wherein each frequency set of the plurality of frequency sets includes a plurality of frequency channels specified for frequency hopping; and
at least one processor in communication with the non-transitory processor-readable memory, the at least one processor configured to:
select or change a selection of one of the plurality of frequency sets as a current frequency set;
generate an index value;
select a frequency set different from the current frequency set based on at least one of: a pseudo-random algorithm and a periodic interval;
select one of the plurality of frequency channels specified in the current frequency set according to the index value; and
control a waveform of the radio based on the selected frequency channel for a hopping period, and
wherein the at least one processor of each radio node of the plurality of radio nodes is configured to select the current frequency set in a same deterministic and synchronous manner.

8. The frequency hopping radio network of claim 7, wherein each of the plurality of frequency sets is an M-member set, and wherein the index value is pseudo-randomly generated to identify a particular member of an M-member set.

9. The frequency hopping radio network of claim 7, wherein the at least one processor of each radio node of the plurality of radio nodes is further configured to select a frequency set different from the current frequency set upon receiving a set switch command.

10. The frequency hopping radio network of claim 7, wherein one of the plurality of frequency sets is designated as a default frequency set for synchronization bursts, and wherein the at least one processor of each radio node of the plurality of radio nodes is further configured to select a frequency channel specified in the default frequency set based on the index value to carry out at least a subset of synchronization bursts.

11. The frequency hopping radio network of claim 10, wherein the current frequency set is identified in at least the subset of synchronization bursts.

12. The frequency hopping radio network of claim 7, wherein the at least one processor of at least one radio node of the plurality of radio nodes is further configured to generate at least a portion of at least one of the plurality of frequency sets based on spectrum harvesting.

13. A frequency hopping method, comprising:
providing a plurality of frequency sets, wherein each frequency set of the plurality of frequency sets includes a plurality of frequency channels specified for frequency hopping;
selecting or changing a selection of one of the plurality of frequency sets as a current frequency set;
generating an index value;

selecting a frequency set different from the current frequency set based on at least one of: a pseudorandom algorithm and a periodic interval;

selecting one of the plurality of frequency channels specified in the current frequency set based on the index value; and controlling a waveform of a radio based on the selected frequency channel for a hopping period.

14. The method of claim 13, wherein each of the plurality of frequency sets is an M-member set, and wherein the index value is pseudo-randomly generated to identify a particular member of an M-member set.

15. The method of claim 13, further comprising:
selecting a frequency set different from the current frequency set upon receiving a set switch command.

16. The method of claim 13, further comprising:
designating one of the plurality of frequency sets as a default frequency set for synchronization bursts, and
selecting a frequency channel specified in the default frequency set based on the index value to carry out at least a subset of synchronization bursts.

17. The method of claim 13, further comprising:
generating at least one of the plurality of frequency sets based on spectrum harvesting.

* * * * *